(12) United States Patent
Wang

(10) Patent No.: US 9,171,094 B2
(45) Date of Patent: Oct. 27, 2015

(54) ELECTRONIC INFORMATION FILTERING SYSTEM

(76) Inventor: Lixiong Wang, Beijing (CN)

( * ) Notice: Subject to any disclaimer, the term of this patent is extended or adjusted under 35 U.S.C. 154(b) by 322 days.

(21) Appl. No.: 13/212,959

(22) Filed: Aug. 18, 2011

(65) Prior Publication Data

US 2012/0047133 A1  Feb. 23, 2012

Related U.S. Application Data

(60) Provisional application No. 61/375,021, filed on Aug. 18, 2010.

(51) Int. Cl.
*G06F 7/00* (2006.01)
*G06F 17/30* (2006.01)

(52) U.S. Cl.
CPC ...... *G06F 17/3089* (2013.01); *G06F 17/30592* (2013.01); *G06F 17/30595* (2013.01); *G06F 17/30864* (2013.01); *G06F 17/30882* (2013.01)

(58) Field of Classification Search
CPC .................. G06F 17/30592; G06F 17/30595; G06F 17/30864
See application file for complete search history.

(56) References Cited

U.S. PATENT DOCUMENTS

| | | | |
|---|---|---|---|
| 7,398,322 B1 * | 7/2008 | Perlman ........................ | 709/239 |
| 2004/0210550 A1 * | 10/2004 | Williams et al. ................. | 707/1 |
| 2008/0228675 A1 * | 9/2008 | Duffy et al. ..................... | 706/10 |
| 2008/0243933 A1 * | 10/2008 | Holtzman et al. ......... | 707/104.1 |
| 2008/0263131 A1 * | 10/2008 | Hinni et al. .................... | 709/202 |

\* cited by examiner

*Primary Examiner* — Loan T Nguyen
(74) *Attorney, Agent, or Firm* — Erickson Law Group, PC

(57) ABSTRACT

An electronic information filtering system. The system has a link datastore, on the memory, configured to hold one or more links, associated with a network location corresponding to information available over a computer network. The system has a hierarchal tree organizing structure, on a memory, having a plurality of layers and a plurality of units, each layer below a top layer of the plurality of layers comprising two or more of the plurality of units, each unit is associated with a plurality of member records, each member record corresponding to a human member. The system can receive links to be reviewed. The system can prompt a vote of the members of a unit whether to promote a link for review by a superior unit in the next layer above the current layer.

9 Claims, 7 Drawing Sheets

ELECTRONIC INFORMATION FILTERING SYSTEM

This application claims the benefit of U.S. Provisional Patent Application, Ser. No. 61/375,021, filed on Aug. 18, 2010

FIELD OF THE INVENTION

This invention relates in general to web application, more specifically to methods and systems for effective collaboration and collective actions of web users, which can be used to build various functions and operation models.

BACKGROUND OF THE INVENTION

With the advent of Web 2.0, the way of information distribution and communication by evolving from "read-only" to "participation from virtually all the users" has inevitably led to information overload. Without effective filtering, verifying, refining and consolidation, useful contents is buried among an enormous amount of useless information, hence serves no use. The present inventor recognizes the questions of how to solve information overload, to consolidate information, and to take advantage of the information has become a major pressing issue of the Internet evolution.

SUMMARY OF THE INVENTION

A method and system of organizing and filtering information is provided. In one embodiment, Self-Organizing Community (SOC) method and system is provided.

SOC can be applied to build self-organization structure from nonexistence which grows as viral expansion loop and has the mechanism of self-consolidation. As an entity, SOC is a hierarchical, multi-layer organization, formed through progressive election from the bottom up, layer by layer, the overall information consolidation in this structure is fulfilled through democratic-decision process and progressive election from the bottom up, layer by layer, to the top.

In one embodiment, a Self-Organizing Wiki (SoWiki) system and method is provided. The SoWiki is a hierarchical, multi-layered and self-organizing wiki system implemented by infusing wiki function with the SOC. Each unit in SOC structure has wiki function. Members create or update contents through wiki methods, which will become effective if the majority of members vote in favor. The elected leader is empowered to take the contents into to a high unit for further consolidation. Recursively, this will lead to a hierarchy structure of information consolidation, which will not only solve information overload, but also minimize the cost given that it is assumed and distributed among all the units/users of the SoWiki.

In one embodiment, the SOC and SOWiki platform provides the self-organization functions for users to create SOC and SOwiki structures, and the systems to support their respective applications and objectives, as well as their needs in terms structure unit, reorganization, and/or collaboration.

In one embodiment, A Self-Organization Information Process System (SOIPS) is one application of SOwiki, which allows users to filter and consolidate the enormous information collaboratively to create various information products targeting in different regions, field or customers, hence to form business models.

Numerous other advantages and features of the invention will be become readily apparent from the following detailed description of the invention and the embodiments thereof, from the claims, and from the accompanying drawings.

DETAILED DESCRIPTION

Figure 1:
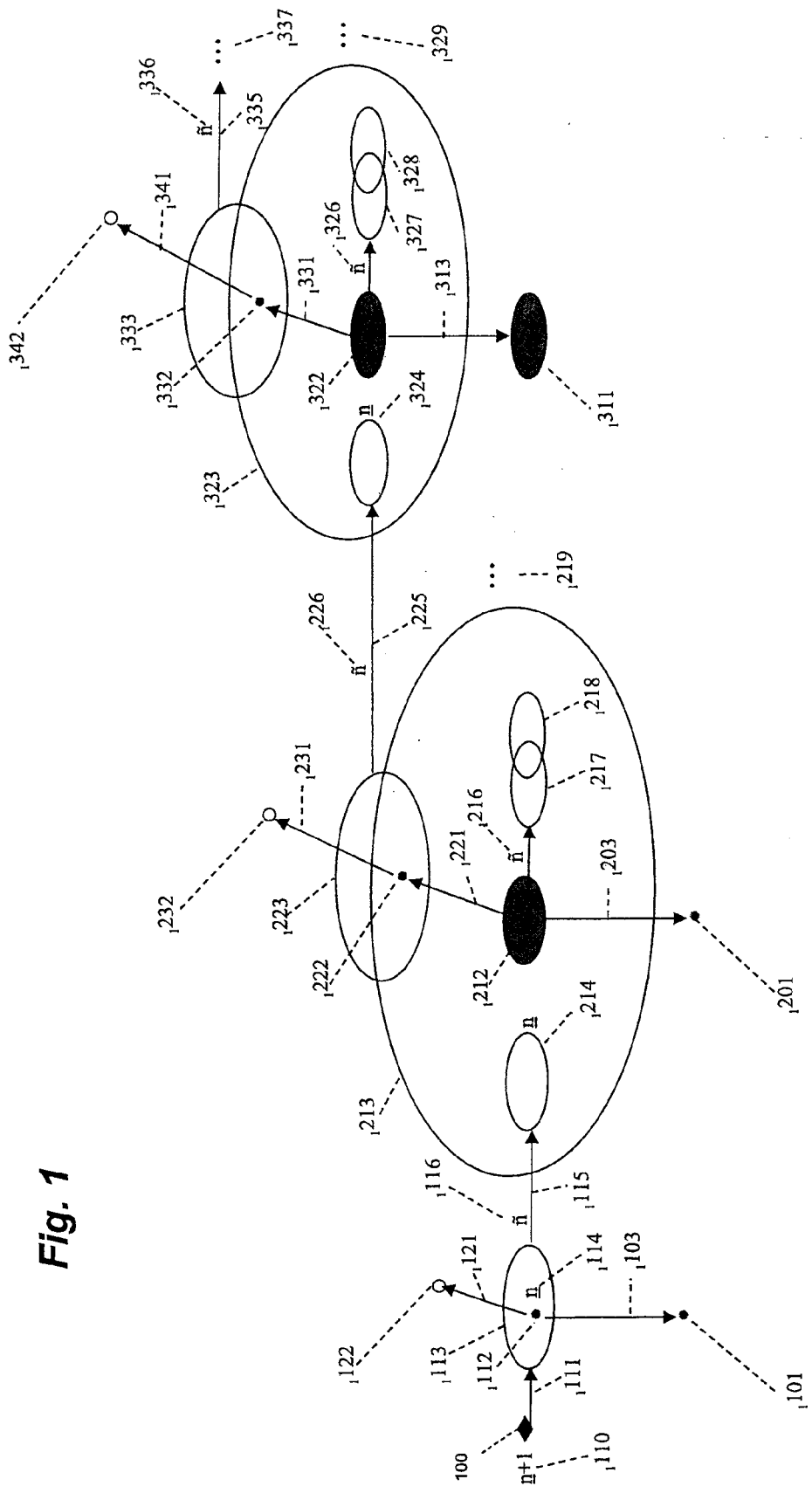
FIG. 1 is a flow diagram depicting an exemplary system and process of forming a SOC (Self-Organizing Community) structure. Starting from inception, SOC expands in size by absorbing new members, grows in hierarchy by unit splitting and new layer creation; the end result of such processes is a hierarchical, multi-layered and self-organizing community, namely, a SOC entity.

A method and system of organizing and filtering information is provided. The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

SOC (Self-Organizing Community)

A SOC (Self-Organizing Community) is a system and method that can be applied to build self-organization structure from nonexistence which grows through a viral expansion loop. The SOC has a mechanism of self-consolidation. The SOC has a hierarchical, multi-layer organization, formed through progressive election from the bottom up, layer by layer, the overall information consolidation in this structure is fulfilled through democratic-decision process and progressive election from the bottom up, layer by layer, to the top.

FIG. 1 provides a flow diagram of a SOC showing the one exemplary method of forming a SOC from inception to a hierarchical, multi-layered and self-organizing community.

To build a SOC structure from non-existence, the first step is to gather $n+1$ ($_1$110) ($n>=3$) founders or initiators from outside the system, which is generally the only external action necessary. In some embodiments, it is required to have at least three members to form a unit to ensure that the unit does not deadlock and has sufficient diversity of participation. In some embodiments, from this point forward, all the actions are operated within the system with no further external control.

A series of parameters need to be taken into consideration to start SOC system: a value n to limit the size of SOC unit; a required motion second minimum number of members who second a motion for changes to prompt the voting process; a pass ratio to pass a resolution for each type of voting; and an algorithm to calculate weight of each vote (explained below), and an inactivity maximum defining how long a member is allowed inactive etc. System provides default values for all the parameters, but founders/initiators have the options to either use default values or provide values they prefer. In one embodiment, n=3, required motion second minimum number of members is ⅔ of n, the unit pass ratio is a ⅔ of the members in a unit and a leader pass ratio a majority of the leaders at the highest layer of the SOC structure. In some embodiments, a majority vote as referenced in this description may be assigned other values by the system default or by vote of the members, e.g. two-thirds. Whenever there is a suggestion or motion to reset parameter(s) ($_5$303), and the motion receives the a motion second parameter minimum number of members (e.g. ⅔ of n) for change the parameter(s), the system will prompt a voting process and the parameter(s) will be reset if predefined percentage (default value: ½) of all the members and a predefined percentage of the leaders (default value: ⅔) at the highest layer vote in favor.

Figure 5:
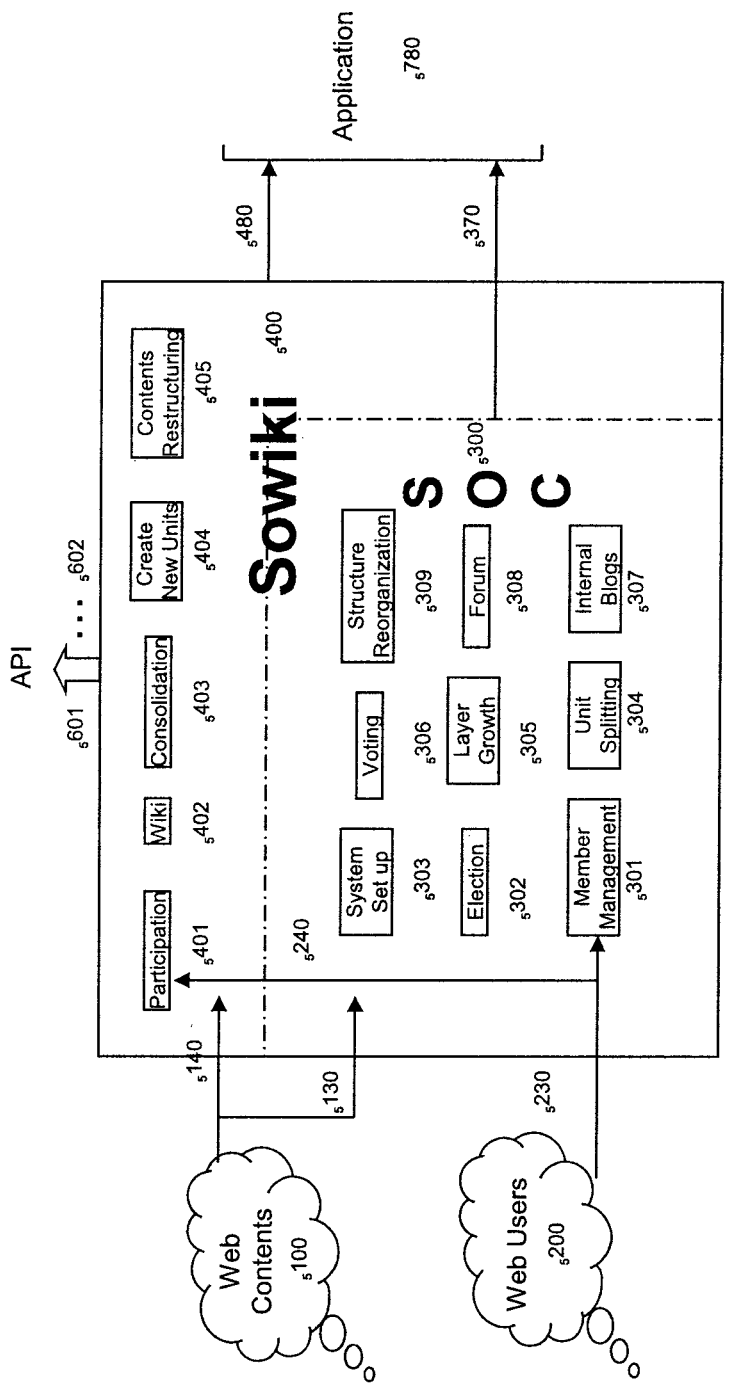
FIG. 5 is a flow diagram depicting some functions of SOC and SOwiki System.

The SOC system also provides functions, tools, and processes for SOC its operation. At least a portion of these functions are shown in FIG. 5. For example, functions, tools, and/or processes are provided for members to set or reset parameter values at any phase whenever there is a suggestion by a member to reset parameter(s) $_5$303, as long as at least the predefined or member-defined motion second minimum number of members second the motion, system will prompt the voting process and the parameter(s) will be set or reset if certain percentage (default value: two-thirds) of all the members and of the leaders (default value: ⅔) at the highest layer vote in favor of the change.

SOC system provides multiple interfaces/tools for members to utilize to present information, communicate with each other, and keep records etc. In some embodiments, these interfaces/tools include one or more of a personal blog, a position blog, a unit forum, and a branch forum. In some embodiments, a blog is a webpage or website maintained by its owner having regular or as required entries with, for example, commentary, descriptions of events, or other material including graphics and video. The content can be entered into the blog in blog posts that are normally displayed in reverse chronological order. In some embodiments, a forum is a webpage, a number of webpages, or a website where members can post entries of commentary, descriptions of events, or other material including graphics and video in forum posts. In some embodiments, the interfaces/tools include messaging services, such as Twitter, Skype, email, and other chat services. The system may utilize an application user interface (API) to communite with third party services. The system provides each member of SOC with a personal blog $_5$307. In some embodiments, all the opinions or activities of a member in SOC are presented and recorded in his or her corresponding personal blog. A personal blog is attached to and moves with its member-owner.

The system provides each leader of the SOC is equipped with position blog $_5$307. In some embodiments, all the opinions or activities in SOC related to the position are presented and recorded in the corresponding position blog. The blog is only editable by incumbent leader presently occupying the position corresponding to a given position blog but is viewable by members at higher levels than the given position. A given position blog belongs to and stays with the corresponding position. In some embodiment, all contents or records of each position blog is archived by the system, and no removal or deletion is allowed.

The unit(s) at each layer of SOC has two types of forums $_5$308. The first is a unit forum. A unit form is for unit members to deal with internal affairs of the unit through discussion or decision making (voting) and is not open to the public. Only the members of a corresponding unit can submit inputs to the corresponding unit form. The units that are subordinate to higher unit can view/monitor the contents of the higher unit, but no input from a subordinate unit is permitted to avoid interference. The second type of forum is a branch forum. All the members in a given branch can submit/view inputs and provide feedbacks to the corresponding branch forum. It is a place for opinions. In some embodiments, referendum via a voting module $_5$306 can be proposed on the forum within the corresponding branch.

Value "n" is a range set to limit the size of an SOC unit. $\underline{n}$ $_1$100, the minimum size of unit, is a value set to enforce an effective democratic process as is provided by a sufficient minimum number of users. The ñ, the maximum size of unit, is a value set to secure sufficient communication and voting among members of the unit.

The trigger point when a given unit has reached the upper limit ñ is that when the unit can be split into at least $\underline{n}$ (the lower limit of a unit) units, and each unit consists of at least $\underline{n}$ members in addition to the leader.

The first or inceptive unit $_1$113 should be founded or initiated by no less than $\underline{n}$+1 people $_1$110, which guarantees that this unit still has no less than $\underline{n}$ $_1$114 people after its leader $_1$122 is elected $_5$302 and promoted to a higher level.

Members $_1$112, $_1$222, $_1$332, $_1$101 and $_1$201 in any given layer are represented as dots in FIG. 1 and the shown member has characteristics that are applicable to all the members in that layer. Units $_1$113, $_1$212, $_1$322, and $_1$311 in any given layer are represented as an ellipse and it has characteristics that are applicable to all the units in that layer.

Each SOC unit has autonomous right to manage its internal affairs, which may include leader election $_1$121 and new member $_1$101 recruiting $_1$103, or ther rights as determined by voting processes of the unit, etc. In a given structure, such as layer $_1$213, the leaders elected $_1$122 by the subordinate units $_1$214, $_1$217, $_1$218 are to form a new unit $_1$223 of a higher layer, and as well become new unit $_1$223 members $_1$222 who possess dual identities: each assuming all the responsibilities and rights of the corresponding subordinate units $_1$214, $_1$217 and $_1$218 respectively as leaders, and as well, assuming all the responsibilities and rights of the unit $_1$223 of a higher layer as regular members.

In some embodiment, when voting process is prompted for resolution of an issue or question, the factors used to calculate voting weight are: the voting weight of a leader as a member in the upper unit equals to the sum of the weight of all its subordinate units; and the voting weight of a leader in its own unit equals to the average weight of the unit. The weight of each unit is the sum of the number of members within the unit. The weight of each branch is the sum of the weight of all subordinate units within the branch.

Leaders at each layer $_1$122, $_1$222, $_1$232, $_1$332, $_1$342 are elected respectively by the units they belong to. The election can be conducted as requested by a predefined number of unit members or on a predefined schedule. The incumbent leader is not allowed to vote in re-election. Once elected, the new leader will replace the incumbent leader that was not successful in the election.

The members are not allowed to vote for themselves as leader except for the ones in base units. Base units have no subordinate units underneath of them. But if a base unit has failed a predetermined number of times—for example, 5 times—to elect a leader who can meet or exceed the predefined number of votes required for election, the system will interfere so the members in the base units will not be allowed to vote for themselves as leader until leaders are successfully elected.

Whenever a decision is democratically reached by election in a unit, its elected leader is accountable to execute and implement the decision. And the decision is applicable to the unit, as well as its subordinate branch (if existing). A subordinate branch includes all units under or subordinate to a given unit.

SOC can grow by recruiting new members $_1101$, $_1201$ from outside of the structure through its lowest/base level by invitation—which is the method available in the initial phase of SOC implementation—or by self-introduction by the potential new member. The base level or layer includes all units not have a subordinate unit underneath of it. The system will prompt a voting process for the unit that prospective member is intended to join to cast votes, and the prospective member will become member officially and assume all the responsibilities and rights if the majority $_1100$ of the unit vote in favor.

When the inceptive unit $_1113$ reaches the maximum size of ñ $_1116$, a splitting process $_1115$ will be prompted. If there is no upper layer on top yet, e.g. no unit superior to the inceptive unit at the initial stage, the unit will split into no less than $\underline{n}$ new units, each of which should have no less than $\underline{n}$ members, the minimum members for a unit. During the splitting process, members have the option to group freely through coordination. In rare case that such grouping can't meet the requirement within each splitting unit have a membership of $\underline{n}=<n<ñ$ after several repetitions, the system will intervene to re-allocate randomly so that the requirement can be met. The representation of $\underline{n}=<n<ñ$ means that each splitting unit has at least n and less than ñ members.

The open ellipse $_1214$, $_1324$ followed with $\underline{n}$ on the right side of each represents $\underline{n}$ units respectively, each of which contains no less than $\underline{n}$ members. When the unit $_1113$ reaches the upper limit ñ $_1116$, it will split into $\underline{n}$ $_1214$ units, which demonstrates SOC structure expansion in size as shown in layer $_1213$. Exemplary unit $_1212$ represents any unit of layer $_1213$, and exemplary unit $_1222$ represents elected leader of any unit in layer $_1213$.

The leaders elected from the units in layer $_1213$ are as well grouped into units, but at one higher level, which has unit $_1223$, which demonstrates the SOC structure growth in hierarchy. The leaders in layer $_1213$ are also the members of the higher layer unit $_1223$. Member $_1222$ shows such dual identities of being a leader of one unit in layer $_1213$ and a member in one unit $_1223$ of the next higher layer. Member/leader $_1232$ represents leaders of one higher level or layer elected by the units $_1223$ in the next higher layer.

In some embodiments, the principle to emphasize is that in SOC structure, a leader at any given level can't concurrently be the leader or member at its subordinate level. As shown in FIG. 1, when the unit $_1113$ reaches its upper limit ñ, it will split into smaller units $_1214$, and its leader $_1122$ will advance to become the leader $_1232$ of its upper level unit $_1223$ which comprises the leaders of the units $_1214$. Or if there is disagreement, an election will be held within the units $_1214$, and the new leader elect from one of the units $_1214$ will exchange the position with $_1122$ and become leader $_1232$.

Unit in $_1213$ will be prompted into splitting process when it reaches ñ the upper limit $_1216$. Given it already has an upper unit $_1223$, it only needs to split into two units to satisfy the requirement for n<ñ and the requirement that any unit should contain no less than $\underline{n}$ members. The leaders elected by the newly split units will join unit $_1223$ as members. When the unit $_1223$ reaches ñ $_1226$, the splitting process $_1225$ will be prompted. Given there is no upper layer on top yet, the unit should split into no less than $\underline{n}$ new units $_1324$ which contain members no less than $\underline{n}$ respectively, the minimum number required for a unit.

During splitting process, members have the option to group freely through coordination. In rare case that grouping can't meet the requirement $\underline{n}=<n<ñ$ after several repetition $_1100$, system will intervene and re-allocate members randomly to the resulting units so that the requirement can be met. Following the splitting of unit $_1223$, layer $_1213$ will be separated accordingly into several groups $_1219$ of units of same type which have the same structure and follow the same principles.

When reaching ñ, the unit $_1223$ will split into $\underline{n}$ new units $_1324$, which leads to SOC's growth in hierarchy or layer $_1323$. The leaders $_1332$ elected by the each of the units $_1322$ form a new unit $_1333$ of a higher level or layer, and the newly formed unit then elect its leader $_1342$.

FIG. 1 shows a structure (unit or branch) $_1311$ either within this SOC or from other SOCs on the same platform. If structure $_1311$ decides to be transferred under the unit $_1322$, it will become a direct subordinate structure under unit $_1322$ and merge with the original structures under the unit $_1322$ into one SOC structure (unit or branch) if the majority $_1100$ of the members of the unit $_1322$ vote in favor of the merger.

Recursively as described above, SOC expands in size as well as grows in hierarchy by constantly, or on demand, or periodically absorbing new members from its bottom level, splitting into new units and forming new layers at higher level.

SOwiki (Self-Organization Wiki)

Figure 2:
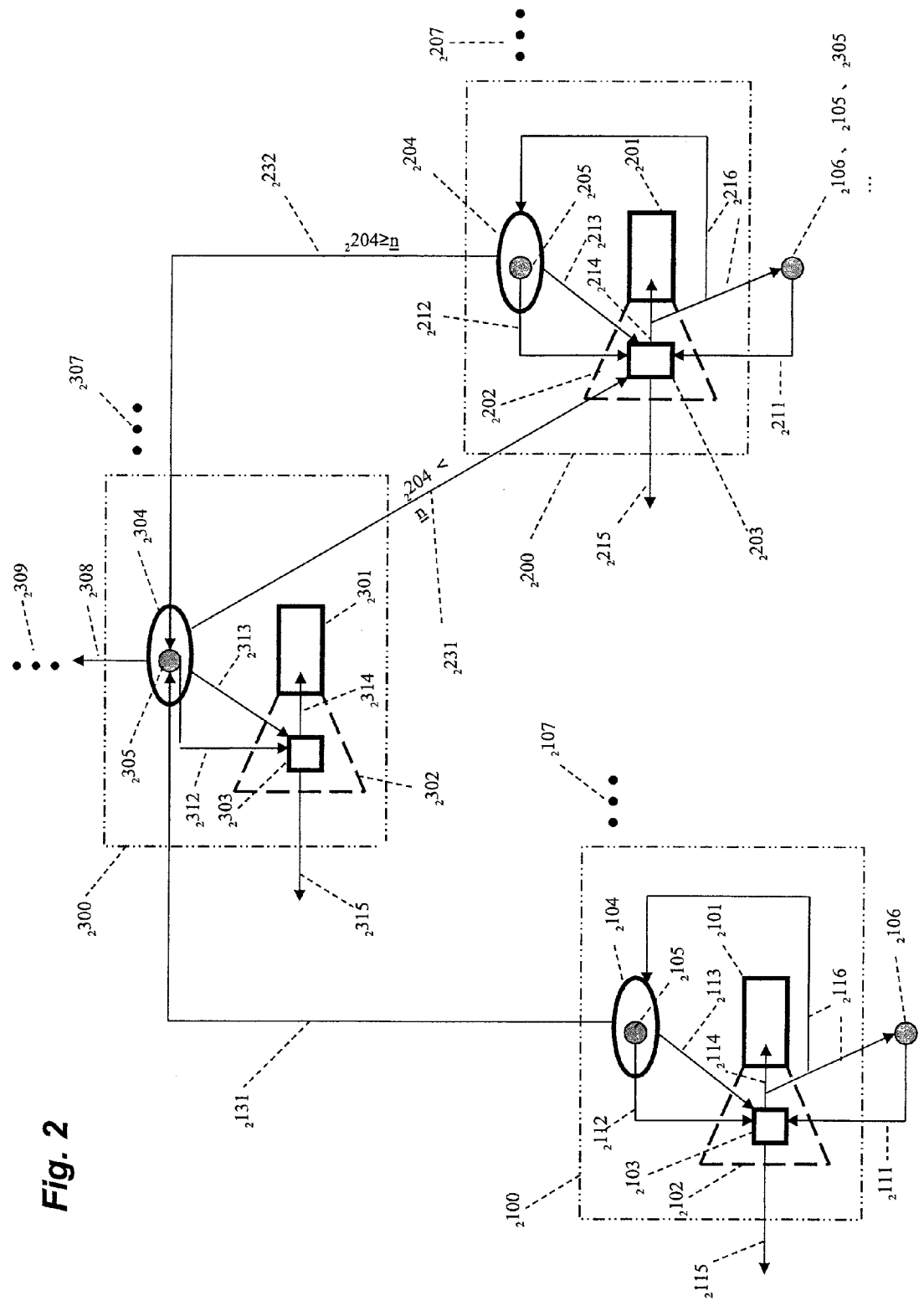
FIG. 2 is a flow diagram depicting the system and processes of creating a Sowiki (Self-Organizing Wiki) structure by infusing a wiki with SOC methodologies, and how objectives at each layer of the Sowiki structure can be achieved and evolved through information gathering, filtering, verifying, refining and consolidating progressively layer by layer from bottom up.

Sowiki (Self-Organizing Wiki) is a hierarchical, multi-layered and self-organizing wiki system implemented by infusing wiki function $_5402$ with the SOC method. An exemplary SOwiki structure is shown in FIG. 2. Each unit in SOC structure has wiki function carried out by the wiki tool as described below. Members can create or update contents through wiki methods with the wiki tool, which will become effective only if the majority of members vote in favor. The leader elect is empowered to take the contents into its upper unit for further consolidation. Recursively, this will lead to a hierarchy structure of information consolidation, which will not only solve information overload, but also minimize the cost given that it is assumed among all the units/users.

In some embodiments, creating a Sowiki structure starts with a SOC initially, that is accountable to define and determine the objectives and form of the SOwiki structure through SOC democratic-decision mechanism. Sowiki structure can be then established by transforming all the members of the SOC into the Sowiki structure as founders or initiators, and expand/grow by absorbing new members on demand, periodically, or constantly.

The method of Sowiki's absorbing new members is similar to that described for SOC: both absorb new members from base layer through invitation or self-invitation. SOC absorbs new members mainly through invitation, but Sowiki mainly through self-introduction in that a prospective member participates by providing submissions, inputs, or content, such as information, webpages, portions or webpages, video, pictures, text, or other content, through a Wiki at the base layer, and will then become the new member $_5$401 if the majority $_1$100 of the member of the unit that the prospective member is intended to join vote in favor of the inputs or contribution provided to the Wiki by the prospective member.

Sowiki structure operates as detailed below.

Units at Base Level

In the FIG. 2, a functional area $_2$100 of existing units at base level of a Sowiki structure is shown. Each unit in functional area $_2$100 may include one or more projects $_2$101 that the unit in functional area $_2$100 is working on through participation and collaboration using wiki tool which allows any changes to be submitted in the mode of wiki editing, where inputs and changes are logged by the wiki tool and are not made effective unless approved by the pass rate minimum number of members of a unit upon a vote of those members. In some embodiments, the wiki tool is a website that allows the creation and editing of any number of interlinked web pages via a web browser using a simplified markup language or a WYSIWYG text editor. In some embodiments, the wiki tool is that described in U.S. Pat. No. 7,954,052, which is herein incorporated by reference to the extent not inconsistent with the present disclosure and except to the extent than according to the present invention edits and changes made to content via the wiki tool are not made effective to the unit project until a majority of the members of the unit where the edit or change was made must approve the edit or change by a predefined approval minimum number of members of that unit before the edit or change is accepted. The outcomes of the projects are dynamic and up-to-date by periodically, on demand, or constantly reflecting new participations and inputs in a timely manner. An inceptive unit $_2$104 creates projects $_2$101, and is entitled to manage and consolidate the project outcomes. The updates to projects $_2$101 will become effective by the system only if the majority $_1$100 of the members of the unit $_2$104 vote $_2$113 in favor, which reflects the basic rule of Sowiki.

The participation in projects $_2$101 comes from two directions: one from one or more members $_2$105 of unit $_2$104 shown as member participation $_2$112, another direction from one or more external users $_2$106, which may represents any individual of same categories outside the unit $_2$104, such as member from other units either within or outside this Sowiki structure, shown as external input $_2$111.

The inputs $_2$103 from a participant, such as a member or a unit $_2$104 via member participation $_2$112 or an external user via external input $_2$111, will not be accepted automatically into the project $_2$101, but will be temporarily stored in the mode of an editable Wiki $_2$102 pending approval from unit $_2$104 to become effective. The inputs $_2$103 will become eligible $_2$114 and be added into $_2$101 if the unit $_2$104 votes in favor; otherwise, the inputs $_2$103 will be discarded $_2$115.

External users $_2$106 from outside of the Sowiki structure can only participate through units at base level. Units above base level only allow its official members to work in its functional areas as shown in functional area $_2$300. Inputs from external users $_2$106 will become effective only if the majority $_1$100 of the members of the unit $_2$104 vote $_2$113 in favor and external user $_2$106 will then be automatically invited to become a member of the unit $_2$104, as shown by the invitation routes $_2$116 pointing to $_2$106 and $_2$104.

Because SOwiki is used to create/verify contents, the members who have not participated in any work, including inputs or decisions, for predetermined inactivity period might lose the familiarity or understanding of the contents of the project, so the system will categorize such members as "inactive members". When calculating the weight of a vote for a member in an upper unit, the system won't include any inactive members in its subordinate units. However, the inactive members can become active anytime and be included in the weight calculation as soon as they resume their participation.

In general, the base units of Sowiki structure are open to the public in order to absorb new members. But Sowiki structure has the option to choose to be exclusive so that only members can participate in its activities. In such case, the system sets parameter for $_2$106 to allow only internal member participation.

Multiple functional areas $_2$107 of base units can be provided under functional area $_2$300 at upper layer. Similarly, multiple functional areas $_2$207, of second level units can be provided under functional area $_2$300 at upper layer and multiple functional areas $_2$307 of third level units can be provided.

Units at Upper Layer

Functional area $_2$300 at upper layer has the same structure as $_2$100, comprising units $_2$304, projects $_2$301 and Wiki $_2$302.

The units $_2$304 in $_2$300 are comprised of leaders $_2$305 elected by the units $_2$104, $_2$107 of the next directly subordinate layer. The elected leaders will automatically become member of its upper units $_2$304. Recursively, new layers will be formed progressively layer by layer as shown by arrow $_2$308.

In Sowiki structure, all the units except ones at base layer are formed by the leaders elected by their directly subordinate units using the principal rules of the SOC method, namely, the "progressive election layer-by-layer" depicted in FIG. 1.

Project outcomes/contents at base layer are open to the public for editing, but the ones at upper layers can only be edited by members of the unit that the project belongs to: such as the project outcomes/contents $_2$301 in the functional area $_2$300 can only be edited by the members of the unit $_2$304. However, except the right of editing, any unit has the authority to decide the right of participation from outside (within or outside of the structure, such as members of other units or external users) regarding attendance of discussions within a unit, viewing contents within a unit, etc., which can be provisioned through setting parameters. This so-called "right of progressive editing" is applicable to all layers. Outcomes/contents become effective only if they are approved by the unit they belong to through voting, regardless of layer they are at.

For instance, the leaders $_2$305 will adjust and consolidate the project contents or deliverables $_2$101 submitted from the subordinate units such as $_2$100, $_2$107 with respect to overall objectives and requirements of project $_2$301 and ensure they are consistent with its existing, if any, outcomes/contents in $_2$301. The adjusted and consolidated results/inputs $_2$303 won't be accepted automatically by the project $_2$301, but will be temporarily stored in the mode of an editable wiki $_2$302 pending approval from unit $_2$304 to become effective. The inputs $_2$303 will become effective and be added into project $_2$301 if unit $_2$304 votes in favor, otherwise the inputs will be discarded $_2$315, the leaders, as well as the members of the subordinate units have to repeat the steps mentioned above until their submissions are approved and added into project $_2$301.

After the project deliverables from $_2$101 are all validated and added into project $_2$301, every member $_2$305 of unit $_2$304 is eligible to edit any section of project $_2$301 (including the ones that are not submitted by his/her unit) to dynamically reflect updates from subordinate units. The updates will be submitted in the through the wiki tool providing a mode of Wiki editing for approval. The input will become effective $_2$314 if unit $_2$304 votes in favor, otherwise ineffective $_2$315.

When the members in an upper unit of SOwiki structure need to vote on certain issues—i.e. participation, content examination etc., the voting result is based on the votes as weighted from each member: the weight of vote of each member in an upper unit is equal to the total members of the branch underneath the unit from which he is elected as a leader.

The consolidation mentioned above periodically, on demand, or continually elevates progressively layer by layer from bottom up. In one embodiment, the Sowiki can be implemented in an example of writing a book through collective effort of multiple authors: if project $_2$101 represent sections of a book, then project $_2$301 can be considered as chapters of a book which are consolidated from the sections in project $_2$101, progressively by applying the same rules to the bigger consolidation areas, chapters are then consolidated into books, books into collection of works and so on. Continuation $_2$309 represents such elevation.

The project outcomes/contents at upper layers are also dynamic by reflecting updates that rapidly bubble up progressively layer by layer from bottom: on the one hand, subordinate units require their leaders elected to reflect updates to the upper units; on the other hand, leaders won't just report updates passively, in addition to self-actualization, leaders are motivated as well by a SOC promotion mechanism that promotes leaders who aggressively pursue the units directions. The SOC promotes a democratic system where a leader of a unit will be motive to effectively pursue the will and direction of the unit, as expressed through voting, otherwise the leader could lose the leadership position at re-election or on demand by a re-call vote of the members of the unit.

The democratic operation mechanism of SOwiki structure can prevent the leaders elected at each layer from being negligent in terms of reflecting updates, or neglecting proper representing their corresponding units. This control comes from following aspects: a subordinate unit can recall its leader anytime through election; all the information at any upper layers is transparent to their subordinate layers; leaders' inputs to the upper layer have to be approved by the upper unit through voting. Therefore, participation in Sowiki structure is not random, only members and leaders that promote the overall objectives of this SOwiki structure will be accepted by the other members and leader.

Creating New Unit

By creating new units, Sowiki structure can dynamically self-grow both in size and in hierarchy. The self-grow process is detailed as below.

In the Sowiki structure, any unit either outside of the structure, such as from external users $_2$106, or inside of the structure, such as from members $_2$105, can apply to a targeted unit such as unit $_2$304 to create a subordinate unit such as unit $_2$204 and its functional area such as functional area $_2$200. This new unit $_2$204 is to assume certain sub-project(s) of the overall or parent project such as project $_2$301 of the targeted unit such as $_2$304. The new unit will become part of the Sowiki structure and undertake the assumed responsibilities if the targeted unit such as $_2$304 votes in favor. The applicants for creating such a new unit will become initial members of the new unit.

Regardless which layer a new unit is to be created under, it will have all the attributes of a unit at base layer given it has no subordinate units at the time of creation. Members or users either from external of the Sowiki or internal of the Sowiki $_2$106, $_2$105, and $_2$305 are eligible to provide input $_2$211 for consideration in the projects $_2$201. And the inputs $_2$203 will be submitted via the wiki tool in the mode of an editable Wiki $_2$202 pending approval from the unit $_2$204. However, the inputs $_2$203 submitted $_2$212 by the members $_2$205 of the unit $_2$204 require the same type of approval.

The new unit $_2$203 is not eligible to vote if the number of its members is less than $\underline{n}$. The right of voting will be surrogated by its upper unit $_2$304. The inputs $_2$203 will become effective $_2$214 if unit $_2$304 votes $_2$231 in favor, otherwise, will become ineffective or discarded $_2$215. The voting right will be restored to the unit $_2$204 once the number of the members of unit $_2$204 is equal to or greater than $\underline{n}$.

Once the inputs are approved by the new unit or its upper unit, the participant who provided the inputs will automatically be accepted as member of the new unit and assume all the responsibilities and rights of a unit member $_2$205 via path $_2$216.

Once the new unit $_2$204 grows to a point of having a numbers of member equal to or greater than $\underline{n}$, it becomes eligible to operate independently by assuming all the responsibilities and rights of a regular unit such as making decision for the unit by voting $_2$213; electing $_2$232 its leader to represent the unit in its upper unit $_2$304 etc. Unit $_2$304 will no longer play the role of guardian or surrogate for unit $_2$204, and functional area $_2$200 will operate the same as functional area $_2$100 from that point forward.

Unit Splitting

The Sowiki structure is constructed for the objectives of its projects with respect to contents, which should not be divided randomly by Sowiki. So Sowiki unit will not split automatically as occurs with the SOC method when the unit reaches its upper limit, which is why Sowiki structure only prescribes the lower limit $\underline{n}$ of a unit; the upper limit $\tilde{n}$ will be defined by unit according to the nature of its project instead being set rigidly by system. The Sowiki unit will split if the majority of its members agree that their project can and/or should be split into branches.

The process of Sowiki unit splitting provides that, when the unit to be split has no upper layers, the projects of the splitting unit will be split into $\underline{n}$ sub-projects first based on the decision democratically made by the unit through voting, and the members of original unit will then be associated with sub-projects around which the new subordinate units are formed. If the original unit is at base layer, its members will populate the new subordinate units by choosing the sub-project they are interested in, otherwise, they will populate new subordinate units by choosing the sub-project that the units they are representing are interested in respectively. However, each unit has to meet the requirement for having no less than $\underline{n}$ members. In the case of deadlock where the unit splitting cannot meet the minimum $\underline{n}$ members requirement after several $_1$100 repetition of the steps mentioned above, system will intervene and splitting process will be completed by system randomly or according to a predefined algorithm that is designed to simulate random placement, such an algorithm that utilizes numbers provided by an algorithm that simulate the random output of number known in the art. But when the unit to be split has upper layers, it can be split into less than $\underline{n}$ subunits which are all subordinate to the original upper unit in the higher layer.

The units above base layer can decide autonomously if they should grow/create new subordinate units, the process of which is similar to that of splitting except that the process of creating new subordinate units does not need to comply with the constraint that the original unit is required to split into no less than $\underline{n}$ subordinate units. The newly created subordinate unit will be at the same layer of, and in parallel with, the original subordinate units under the senior unit that indicated the subordinate unit creation. New subordinate unit can be created flexibly whenever needed.

SOC and SOwiki Structure Reorganizations

Figure 3:
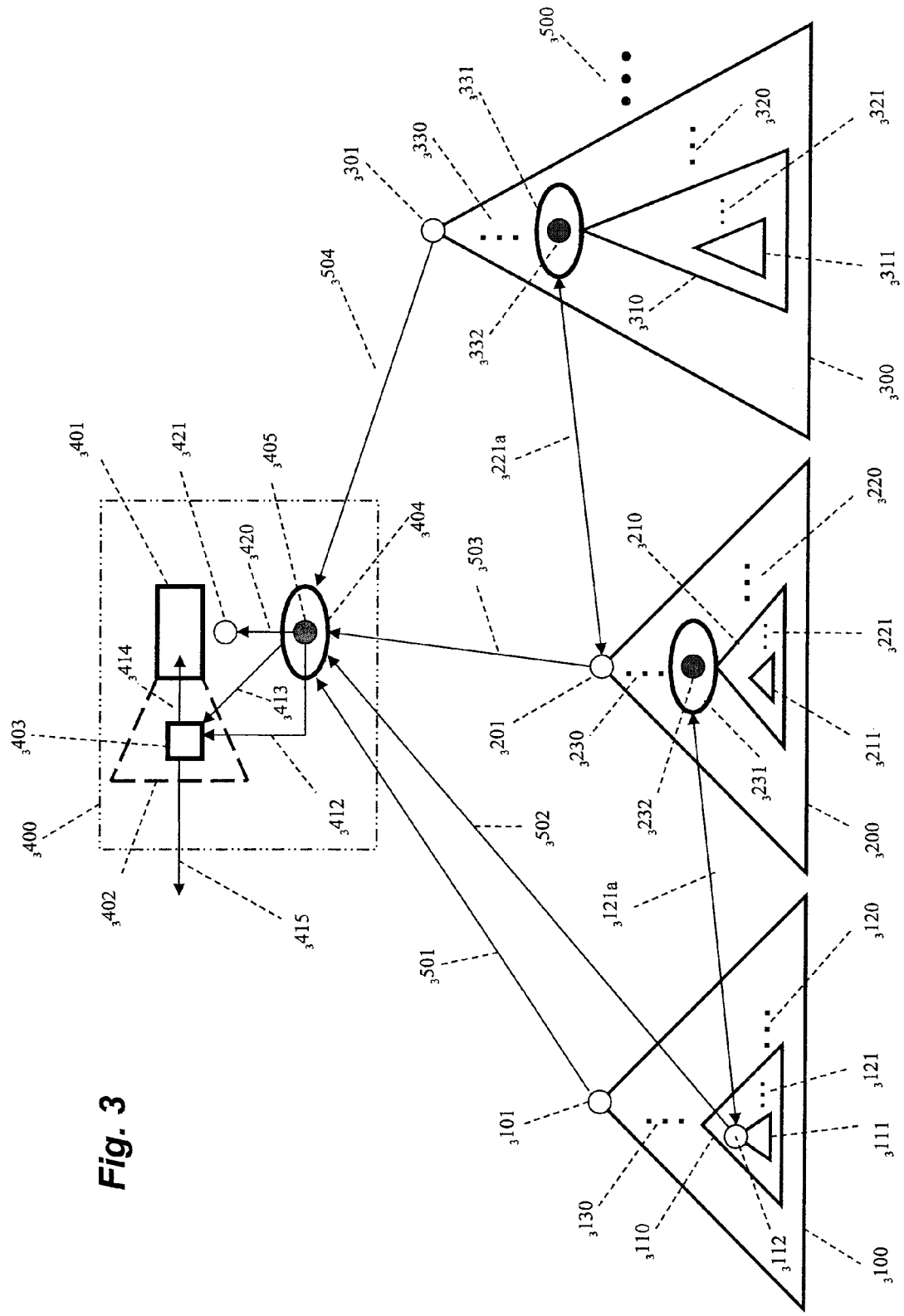
FIG. 3 is a flow diagram depicting the system and processes of SOC and SOwiki structure reorganization by creating dynamic and rich forms of SOC or Sowiki structures through unit or branch transferring, merging, seceding or affiliating within the same structure or among different structures.

In FIG. 3, triangle represents branches of Sowiki structure and a small triangle in a big triangle represents a small branch within a big branch. The lateral ellipses $_3121$, $_3221$, $_3321$, $_3120$, $_3220$, $_3320$, $_3500$ represent the lateral expansion by the addition of the same respective structures laterally along the same layer or level. The vertical ellipses $_3130$, $_3230$, $_3330$ represent hierarchical expansion by layers respectively upward.

The highest elected leaders $_3112$, $_3101$, $_3201$, $_3301$, $_3421$ in each respective branch are shown. Further, in FIG. 3, the highest unit $_3231$, $_3331$ and $_3404$ in a respective branch are shown and members $_3232$, $_3332$, $_3405$ of the highest branch respectively are shown. Details for certain units or portions of branches are not shown in FIG. 3 so as to demonstrate the overall structure.

Structure (Units or Branches) Transferring

When a unit or branch in a Sowiki structure secedes from its upper unit, and joins under another unit within the same Sowiki structure is called transferring.

In case that branch $_3100$ and branch $_3200$ belong to a same Sowiki structure, and structure $_3111$ (which may be a unit or branch) decides to transfer under or within branch $_3210$, the elected leader $_3112$ of the structure $_3111$ will need to file application to the upper unit $_3231$ (consisting of the elected leaders $_3232$ from the units $_3211$ and $_3221$) for such transfer. Structure $_3111$ will then be transferred into $_3210$, hence become a subordinate structure $_3221$ under the unit $_3231$ if the unit $_3231$ votes in favor; the elected leader $_3112$ will become a member $_3232$ of unit $_3231$. If structure $_3111$ is a branch with subordinate units, the whole branch (including all the subordinate units) will be transferred together into branch $_3210$.

The Sowiki structure will not allow a unit or branch to have more than one immediately senior/upper unit to avoid overlapped voting rights. Therefore, the first step of transferring is to secede from the original upper unit in order to avoid having two immediately superior unit.

Whether or how the transferred units can take away the projects they are working on to the new structure depend on the setting of the Sowiki structure based on the agreement achieved within the structure. Therefore, in some embodiments (1) the transferred unit can take all of the projects currently pending to the new structure, (2) the transferred unit can not take the projects currently pending to the new structure, and (3) the transferred unit can take the projects currently pending to a new structure only if a majority of the members of the immediately senior unit above the transferred unit approves of the transfer of currently pending projects.

Structure (Unit or Branches) Merger

One of the methods to merge units is to combine different units within the same Sowiki structure, along with their projects and members. If the to-be-merged units are subordinate to the same upper unit, they, as well as their projects and members, can merge into one bigger unit if the majority of the immediately upper unit vote in favor for the motion of merger. The merged unit will then assume all the responsibilities and rights with respect to the combined projects.

The units, that are within the same SOwiki structure, but subordinate to different units, can merge provided that the upper unit of the unit at the receiving end votes in favor to the motion of taking over the unit that has applied to merge in. The unit to be taken over will be required to "transfer" (refer to transferring section) first under the upper unit at the receiving end and then merge as demonstrated in the proceeding paragraph.

Another method of merging is with respect to different Sowiki structures. Therefore in some embodiments, it is assumed that branch/structure $_3200$ is an independently created and self-evolved Sowiki structure and decides to merge into structure $_3310$ in another Sowiki structure $_3300$ and to be one of structures $_3321$ at the same level with structure $_3311$, the highest elected leader $_3201$ of the structure $_3200$ will need to file application $_3221a$ to the unit $_3331$; The structure $_3200$ will be then merged into structure $_3310$ and become one of the structures $_3321$ and leader $_3201$ will be accepted as a member $_3332$ of unit $_3331$ if the majority of the members of unit $_3331$ vote in favor of the merger. Whether a structure is accepted for merger depends on the vote of the receiving superior unit as well was whether the resulting merge structure will violate any parameters of the system, such as structure size, which is considered by the receiving superior unit.

Structure (Unit or Branch) Secession

As mentioned above, the process of a structure (unit or branch) transferring consists of two major steps: secede from its original upper unit first; and then merge into the targeted structure. Alternatively, a structure can decide to secede from the Sowiki structure it belongs to and become an independent Sowiki structure.

It is the given right of Sowiki unit or branches to secede, but the key is if the projects they are working on can secede as well and go along with the seceding structure, which requires the agreement or contract with respect to secession being established during the inception of Sowiki structure. The agreements or contracts can be executed and guaranteed by the Sowiki operating system/platform through parameter setting.

If the secession leads to that the members of the original unit become less than n, the seceded unit will lose its right of autonomy, which will be surrogated by its upper unit, and reinstated once the number of its members grows to no less than n.

Structure (Unit or Branch) Affiliation

Horizontal affiliation is to achieve specific objectives by uniting different Sowiki structures without losing their attributes and intactness as independent structure (unit or branch). The affiliation is of extensive applicability and can be either temporary or permanent.

Horizontal affiliation can be created by loosely uniting different units or branches within a Sowiki structure. In some embodiments, assuming that $_3111$, $_3200$, $_3300$ are different branches in the same Sowiki (they might be at different levels, but this will not have an impact on affiliation), the process to unite them requires that the highest elected leader of the affiliating branches $_3112$, $_3201$, $_3301$ reach agreements for affiliation in terms of objectives, parameters and new leader election $_3421$ etc. with respect to the new structure (each affiliation is considered as creating a new structure) by negotiation and collaboration. The leaders from each original structure form a new unit $_3404$ and the affiliation will then be administrated by the leader $_3421$ elected by unit $_3404$ or directly by unit $_3404$ working as a committee. Once the affiliation is created, its functional area $_3400$ will be automatically created by the Sowiki platform and open for use.

The members $_3112$, $_3201$ and $_3301$ of the unit $_3404$ at highest level of the Sowiki affiliated structure will adjust and consolidate the projects they are representing respectively with respect to overall objectives and requirements of unit $_3404$. The adjusted and consolidated input $_3403$ won't be accepted automatically by the project $_3401$ and will be temporarily stored in the mode of an editable wiki $_3402$ pending approval from unit $_3404$ to become effective. If unit $_2404$ votes in favor $_3413$, the inputs $_3403$ will become effective and be added into project $_3401$; otherwise, the steps mentioned above are repeated until approved and added into project $_3$401. Further adjustment and consolidation of project $_3$401 by the unit $_3$404 follows the general Sowiki rules and principles depicted in FIG. 2 and the related description.

However, this horizontal affiliation can as well be created by uniting units or branches from different Sowiki structures. In some embodiments, if it is assumed that $_3$111, $_3$200, $_3$300 in FIG. 3 are different Sowiki structures, the flow diagram of creating such an affiliation is the same as demonstrated above.

Once the affiliated structure is formed, the appropriate forums, wiki areas, position blogs etc. will be created automatically by the platform and open for use as detailed in the section above on the SOC.

The affiliation can be objective oriented or structure oriented. The objective oriented affiliation is usually temporary and will be dismissed after the objectives are achieved. The structure oriented affiliation usually has long-term goals and therefore more stable.

Such affiliation is realized only through the leaders at the highest levels i.e. $_3$100, $_3$200, $_3$300 and each individual Sowiki structure is kept intact and can be removed from a new structure and restored to original structure easily. This loosely connected structure keeps the advantages of small structures: higher-level of autonomy, efficiency and varieties etc., as well has the benefits of big structure: broader spectrum of view, more resources.

Affiliations can cross and overlap, for instance, the leader elected $_3$421 of the affiliation can choose to unite with another structure to form a new structure with respect to new projects or new objectives.

In summary, SOC and Sowiki have rich and flexible ways of evolving horizontally or vertically in terms of hierarchy and size by utilizing the methods and functions mentioned above such as new units creating, unit splitting, unit merging and combining etc., hence to achieve an evolving space to accomplish very effectively various objectives.

Self-Organization Information Process System (SOIPS)

Figure 4:
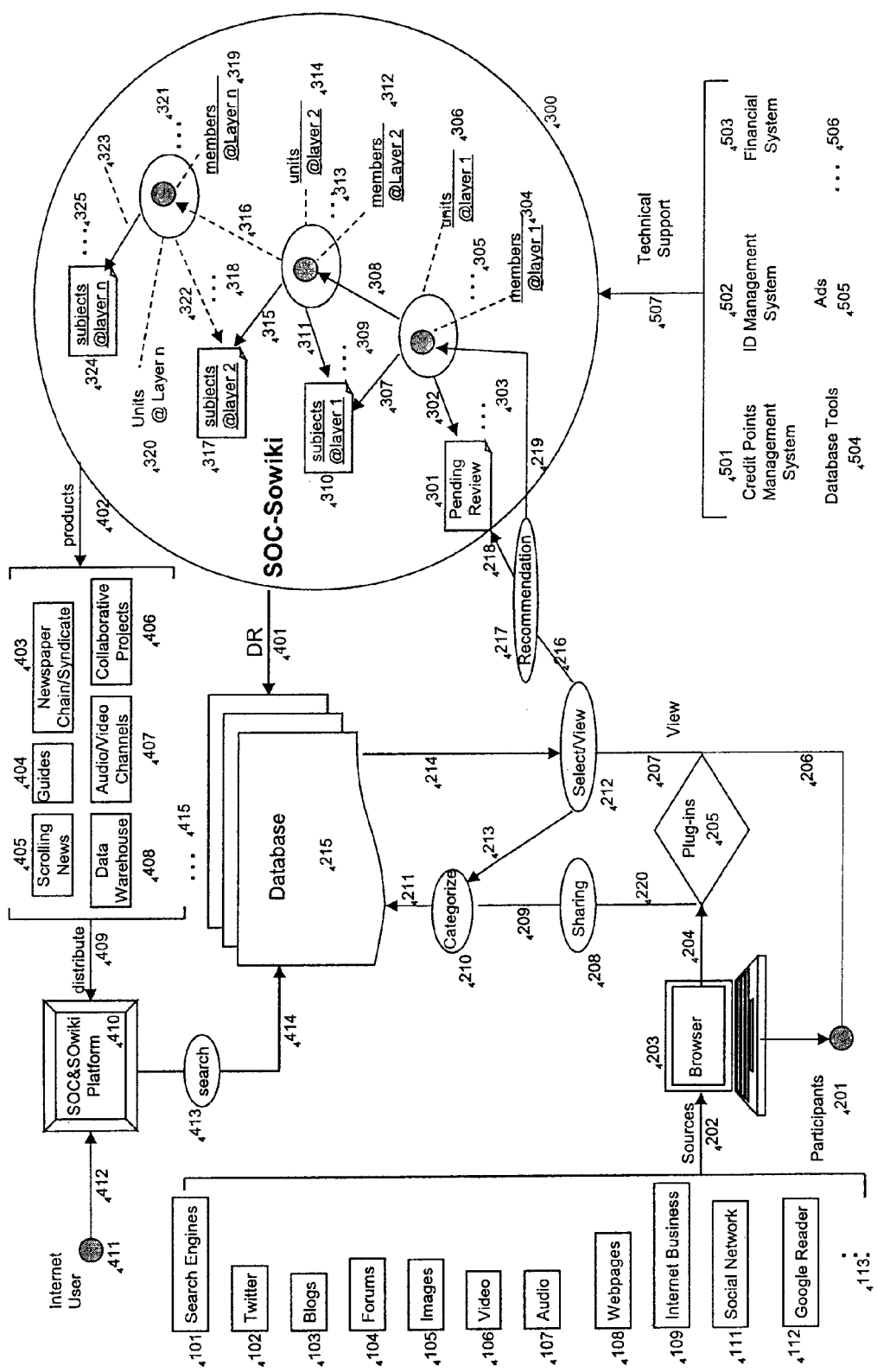
FIG. 4 is a flow diagram depicting how users use the Self-Organization Information Process System (SOIPS) to filter, consolidate and refine the web information through SOC-SOwiki structure layer by layer from bottom up, based on which how various information products are created.

The flow diagram FIG. 4 depicts how users may use a Self-Organization Information Process System (SOIPS) to filter, consolidate and refine web information through SOC-SOwiki structures layer by layer from the bottom up, based on how various information products are created. In one embodiment, the SOC, SOwiki, and SOIPS are systems and methods of the distributed allocation of work.

The grey dots in the FIG. 4 represent any one item of the same categories in which all the items possess the same attributes. The solid dots represent multiple projects of same kind.

Participation

As shown in FIG. 4, any web user can become a participant $_4$201. The SOIPS provides a user interface. In some embodiments, the SOIPS includes a standalone program installable on a user's device, such as a computer, tablet, mobile smart phone, or other programmable computing device. In some embodiments, the SOIPS includes an internet web browser plug-in $_4$205 that is installed in the user's browser $_4$203. In some embodiments, the SOIPS is accessible over, a computer network, such as the Internet via the browser $_4$203 without the need of any software installed on the user's computer or computing device.

Information is submitted to the SOIPS computer database $_4$215 by participants. In some embodiments, access to the database may be mediated through a database management system, such as those known in the art. When a participant $_4$201 browse or process web information, if the participant believes that some information, content, data—such as a website, webpage, or a portion of a webpage, such as a paragraph, headline, picture, video, or the like—is worth sharing, the participant can click the Share button $_4$208 provided by the plug-in $_4$205 or other user interface, and the information will be automatically collected by the SOIPS, processed into standard format, and then stored in the computer database $_4$215.

Figure 6:
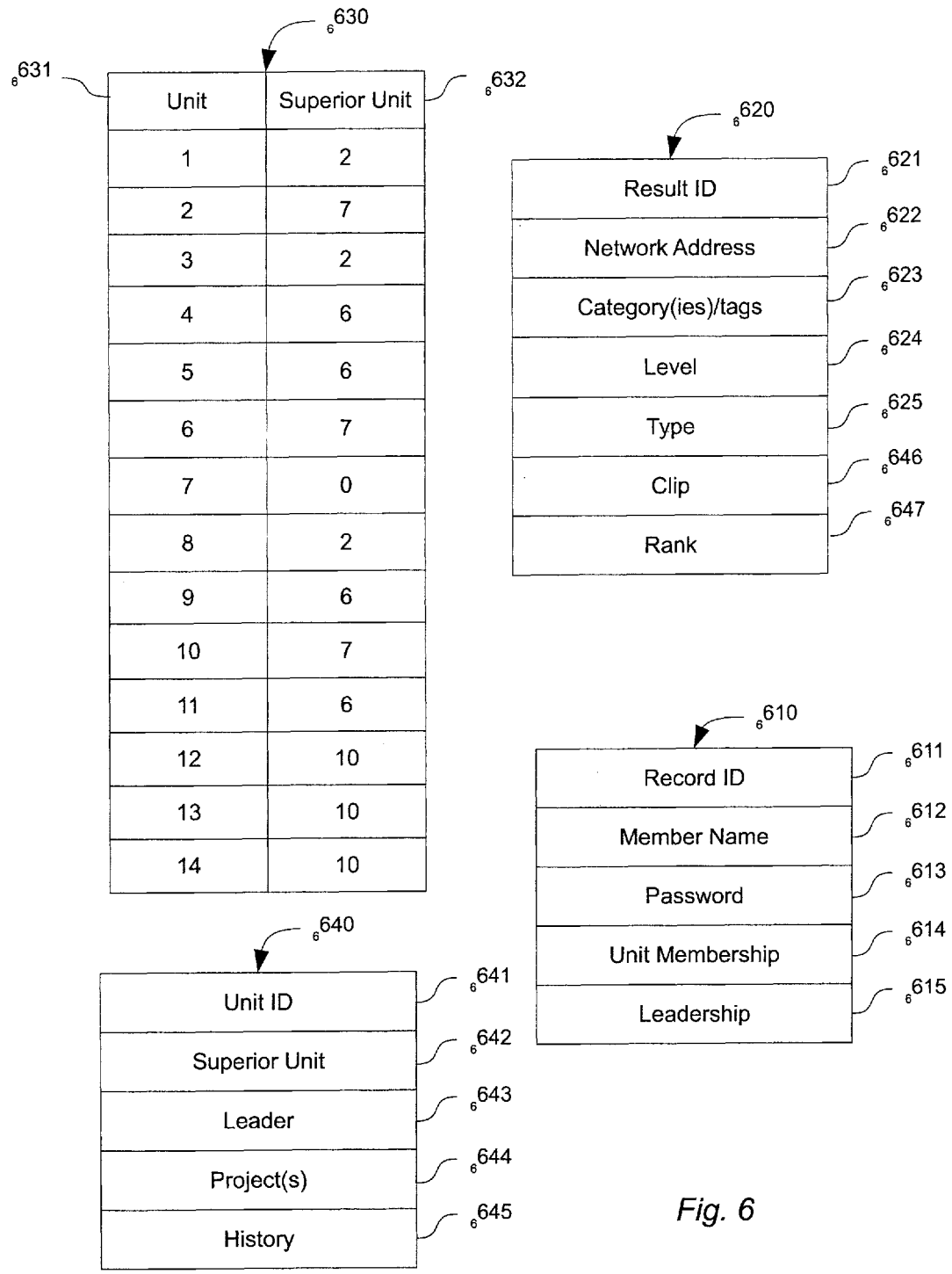
FIG. 6 is a diagram view of a relationship table, a unit record, a link record, and a member record of an embodiment of the invention.

Some embodiments, the information shared by the participant is saved in a link record $_6$620 as shown in FIG. 6. The link record includes a result ID section $_6$621, a network address section $_6$622, a category(ies)/tag section $_6$623, a level section $_6$624, a type section $_6$625, a clip section $_6$646, and a rank section $_6$647. The result ID is a unique result indentifier, such as a number. The network address section $_6$622 contains information about where the content is located on the network. The network address section $_6$622 may be a Uniform Resource Locator (URL), an IP address, a page location indicator for identifying where on an Internet web page the selected content is, or any combination of the forgoing, or other network location information formats known in the art. The category(ies)/tags section contains one or more categories or tags that purport to classify or describe the information associated with the network address. Tags and categories maybe chosen from system defined lists or may be freeform entered by a user or member. The type section $_6$652 contains information about what type of information is found at the network address, e.g. text, video, pictures, animation, or other classes of content. The clip $_6$646 may section contains a portion of the content at the network address. The clip section may contain a section of text, an image, a thumbnail of an image, a section of video, or the like. The rank section $_6$647 contains the DR rank, as explained below, of the contents associated with the network address.

Information can be submitted to the SOIPS from any Internet or network source, such as search engines $_4$101, Twitter $_4$102, blogs $_4$103, forums $_4$104, images $_4$105, video $_4$106, audio $_4$107, webpages $_4$108, Internet business $_4$109, social networks $_4$111, RSS readers $_4$112, etc.

In some embodiments, the computer database $_4$215 is connected to a server or other computer (not shown) for providing access and modification to the database. The database maybe maintained on a computer storage, such as a hard-drive, a number of hard-drives, solid state storage, or other database storage mediums known in the art.

Each participant can categorize $_4$210 the information to be shared by adding one or more tag. Tags may be understood as a keyword(s), or term(s) assigned to a piece of information, which may provide additional information about the information being tagged. Tags may be understood as metadata for the information being tagged. In some embodiments, the SOIPS has a duplication reduction function that can process the data submitted by participants to consolidate data about the same information that might be submitted by different participants. In some embodiments, the SOIPS has an automatic categorization function where by comparing the content of the information submitted to a pre-existing word association database, the categorization function can add tag and category information based on matches generated.

As information is submitted to the SOIPS, a large dataset may be accumulated. Participants filter the information. After the steps mentioned above, the enormous and complex internet information in this database is filtered by participants, has formed the preliminary category structures, hence possess the value to "Select/View" $_4$216, and will be also given the DR value (see the section "DjRank for details).

The SOIPS has a select/view function $_4$212 that allows a participant to select and review information in the database $_4$215. The view/select function allows a user to define or select the categories $_4$210 of information that each user wishes to review. In some embodiments, participants or users $_4$201 only need to click the "Select/View" button on the plug-in $_4$205 to select and review the filtered/categorized/tag information that they are interested in. And the SOIPS will automatically assign $_4$214 certain contents to a participant, such as a small fragment of contents within the subjects/categories area chosen by or preset by or for the user that they are interested. Each participant will be given different non-overlapped fragments of the contents within the database $_4$215. The select/view function divides the contents of the database under according to certain predefined characteristics, such as categories and apportions a subset of that data into affordable or manageable assignments to be assumed and processed by a plurality of corresponding participants.

The SOIPS has a recommend for promotion/recommendation function $_4$217 where a participant, at the time of select/view function $_4$212 can vote or decide whether the information begin reviewed, in the participant's judgment, is valuable for the given category of information. If the participant finds the information valuable, the participant can through the recommend for promotion function $_4$217 recommend said information as being valuable for the corresponding given category(ies) of information. In one embodiment, the SOIPS provides a recommend button that a participant can press to recommend the reviewed information during the review process.

The SOIPS also provides a re-categorize function so that each participant can not only recommend the contents further that he/she believes are of any value by clicking the rommendation button, but can also correct or further categorize $_4$213 the information being reviewed. If there are enough participants, although each only assumes a fragment of the contents of the database, a second round of filtering and consolidation utilizing the SOIPS with respect to the data stored in the database can be achieved.

SOC System and Method

The contents that are recommended under the recommendation function $_4$217 by the participants $_4$201 during Select/View function $_4$212 will be added into SOC-SOwiki structure $_4$300 (see FIG. 4) pending further review under the pending review function $_4$301.

The information in the pending review function $_4$301 will be automatically categorized and tagged by the SOIPS system. In some embodiments, the SOIPS has an automatic categorization function where information is categorized based on keywords extracted from the information which can be based on the full text of the information, the title of the page having the information, the backlinks to the page having the information, the anchor text associated with the backlinks to the page having the information. In some embodiment, the automatic categorization of information in a search database maybe any such function or method known in the art and not inconsistent with the present disclosure. The SOIPS will then assign information queued in the pending review function to one of the units $_4$306 in layer 1 of the SOC-Sowiki. In one embodiment, each of the units $_4$306 has one or more categorizes of information that it is assigned to review and the SOIPS assigns information queued in the pending review function to one or more units based on each having an assigned category corresponding to the category of the information queued. Once information is assigned to a unit $_4$306 in layer 1, it is further assigned by the SOIPS to a layer 1 member $_4$304 of that layer 1 unit $_4$306, for further assessment or correction. For instance, the information will be corrected if the previous categorization is not accurate and then be returned to pending review function $_4$301, and the system will then reassign the information to a different unit $_4$306 of that layer having unit category corresponding to the category of the information.

The system provides a two step information review. The first step is a preliminary review by a member of layer 1. Each layer 1 member $_4$304 will perform a preliminary review of the information that the system has assigned them. If the member believes that the information is worthy of further recommendation, the member $_4$304 will preliminarily recommend that information by signaling the same to the system. At the second step, the system initiates a unit vote where the contents recommended by layer 1 members of a unit will be sent by the system to all the other members in that unit and each member will then to vote on whether the information should be promoted to the next layer.

The information that has the votes meeting or exceeding the passing rate (pre-set parameter) will be sent to the layer 1 subjects section $_4$310, and the participants $_4$201 who have recommended the contents during select/view function $_4$212 will automatically be invited into membership of layer 1 by the system. As members of layer 1 they are eligible to manage the layer 1 subjects, and will assume all the responsibilities, as well as the rights of layer 1 members. However, the invited participant may refuse to accept or may decline the membership invitation to layer 1 or any other layer.

The content that does not have votes meeting or exceeding the passing rate, will not be included in layer 1 subjects. However, if the content was recommended at the recommendation function 4217 and by at least one reviewing layer 1 member 4304 it will be assigned a DJ (see the DR Rank section below) ranking.

The leader elected $_4$308 by the layer 1 members will become a layer 2 member $_4$312. Therefore, the number of the members in layer 2 units $_4$314 is equal to the number of its direct subordinate layer 1 units.

The layer 2 members $_4$312 review the contents in layer 1 subjects $_4$310 that were recommended by the layer 1 units. The system distributes the contents in layer 1 subjects to the layer 2 members according to a predefined algorithm. In some embodiment, the algorithm is designed to similar random assignment. However, if the contents was assigned to one given layer 1 unit, the system will not assign that contents to a layer 2 member that is a member of the given layer 1 unit, where that contents was previously considered by that given layer 1 unit, to avoid prejudice. Each layer 2 members can further recommend the contents that he/she believes are of value during preliminary review at layer 2. Contents recommended by layer 2 members are the preliminary reviewed will then be presented by the system for a unit vote. If the votes of the members received meet or exceed the pre-set passing rate $_4$315, the contents will then be automatically sent to layer 2 subject area $_4$317.

The leader elected $_4$316 by the layer 2 members will become the members of the upper layer, namely here layer 3 members. The contents of layer 2 subjects area will be assessed by preliminary review and a unit vote will be conducted among the layer 3 members, if the votes of the layer 3 members meet or exceed the pre-set passing rate, the content will be escalated and become the layer 3 subjects. The dotted lines $_4$316 and $_4$322 represent the that there may be any number of intermediate layers (not shown) and subjects (not shown) towards the highest layer N units $_4$320 and its layer N subjects $_4$324. The rules at each layer are the same.

DR Rank

The aforementioned system and methods provide means to attract participants into SOC structure through which information can be filtered layer by layer from the bottom up, and the filtered information will be given a value according to the level it has reached. Different from filtering system through machine-only algorithm, DR ranking takes advantage of human knowledge and wisdom to enhance the quality of search $_4$413 results. It is hard to judge the quality of search results though the ranking generated by a computer algorithm. Taking advantage of human wisdom is way to enhance the search result with higher accuracy in terms of statistic significance that is achieved through participants input, as well, by the filtering power of the layered SOC structure. In some embodiments, the large scale participation of participants can distribute the work and further enhance the accuracy of the search results $_4$413.

SOC structure filters information in two ways: voting by members and decisions by the leader. DR ranks may be provided on information based on the filtering process. Under the voting by members process, members will receive distributed contents from the subordinating units, or from Internet user if the unit is on the base layer (see $_4$217), from which, members will preliminarily recommend the information he/she believes is of value. The recommended information will be reviewed by all the other members in the unit and the unit members will vote if the recommended contents is worthy of escalating to next higher level. Recursively, each layer follows the same rules to filter information. In some embodiments of the DR rank system, the system will increase the rank of contents by a value of 1 each time a unit votes to promote the contents. In some embodiments of the DR rank system, the system will increase the rank of contents by a value of 1 each time a member preliminarily recommends the contents and increase the rank of the contents by a value of 1 when a unit votes to promote the contents. In some embodiments, a different value is assigned to content receiving a preliminary recommendation than is assigned to content receiving a unit vote to promote, e.g. +1 for preliminary vote and +3 for a unit vote to promote.

Another method is "decision by leader" where members with receive distributed contents from the subordinating units, or from Internet user if the unit is on the base layer (see $_4$217) from which members will recommend information he/she believes is of value. The leader will select the ones from the recommended contents that he/she believes of value, and escalate them to the next higher level. Recursively, each layer follows the same rules to filter information.

Therefore, at least three types of value events may indicate the content is valuable and thus provide a basis for increasing the DR rank associated with the content, a preliminary recommendation by a member to promote the content, a unit vote of a unit to promote the content, a leader recommendation to promote the content.

In some embodiments the DR rank system, the system will increase the rank of contents by a value of 1 each time a leader promotes the contents. In some embodiments, a different value is assigned to content receiving a leader promotion recommendation than is assigned to content receiving a unit vote to promote, e.g. +1 for preliminary vote and +2 for a leader promotion recommendation. Other incremental values can be assigned each type of value event. In some embodiments, DR rank is the sum rank increases resulting from a preliminary recommendation, a unit vote to promote, and/or a leader promotion recommendation at any layer. In some embodiments, the DR rank of contents is only increase when the content is promoted by a unit vote to promote.

In general, the method "decision by leader" is more efficient than the method "voting by member", especially in initial phase of SOC structure implementation. Once the SOC structure becomes mature and members are active to certain extent, the method "voting by member" should be used as a regular operation as it embodies the SOC advantages, that is, the accuracy in terms of statistic significance through large scale of participation.

The data selected/filtered using "Self-Organization Information Process System" (FIG. 4)—including the data "Shared" $_4$208 or Selected/Viewed $_4$212 by all the participants, as well as the "Recommended" $_4$217 through the layers of SOC structures—are stored in the database $_4$215. The information in this database is hand-picked by individuals and reviewed/assessed by groups (units), hence is of higher quality compared with the enormous random Internet information; all the data collected in the database is given DR values using the methods mentioned above. When the data accumulate to certain extent, users can search by key words—searching results are ordered according to its DR value, or taking advantage of layered SOC structure that covers certain subjects by regions or fields, users can directly go to certain layer of SOC structure, review the information that is filtered to such extent namely, according to the associated DR value.

DR rank is an application of SOC structure, and DR value reflects the results of information filtering through SOC structure. The DR value pyramid represents the quality level of the information, is used to organize information from general to specific by regions or fields, and to provide the convenience to find the targeted information. In SOC structure, the information amount is further reduced and refined over the layers from bottom up which is the way to solve information overload and to enhance searching results. Therefore, DR rank can be used as a new searching method to complement the existing ones, and to mitigate their inefficiency.

Taking advantage of SOC open interface platform and sharable database, users can implement SOC structures (SOC structure can be merged or united) to filter/refine/categorize information by regions or fields. DR value is obtained for each piece of information along the process, and targeted information products are in the mean time generated—Scroll News $_4$405 in the order of DR value, various guides $_4$404, Audio/Video Channels $_4$407 and Data Warehouse $_4$408 etc., These products are the end results of massive participation of users, hence represent and address the needs of users.

SOwiki Methods

SOwiki system and methods are the same as SOC system and methods in terms of its structure and creation. The difference between SOwiki system and SOC system is that members in Sowiki system will also take part in editing and consolidating information in addition to reviewing or recommending information. Under one embodiment of the SOC system, the results consist of a listing of links or contents without any editorial commentary, whereas SOwiki system provides members the ability to reorganize and consolidate contents provide commentary. If the SOC system provides an ordered listing of content, the SOwiki system has the functionality of, in an analogy with the news industry, editorial control to consolidate, paraphrase, reorganize, and editorialize on information based on primary sources, or input from members. The steps are detailed in the following.

The pending layer 1 review contents $_4$301 by layer 1 units $_4$306 will be distributed automatically by the system among the unit members. Each member will consolidate the information assigned to him/her, and submit the result to the layer 1 subjects module $_4$310. Each member can create subjects, expand the scope of the existing subjects, or revisit the subjects already considered. However, all each members efforts of consolidating, creating, expanding, revisiting, etc., must be approved by the other members in his/her unit through voting in order to make them effective.

Hence, the contents of the layer 1 subjects are not composites of the recommended information listed in parallel, as in SOC system, instead, it is a whole piece consolidated by all the members in the unit.

The leader elected by the layer 1 members will become a layer 2 member $_4$312 of a layer 2 unit $_4$314, bringing the consolidated and voting approved layer 1 subjects $_4$310 into the layer 2, which if approved by the layer 2 members will become layer 2 subjects $_4$317, and the leader will participate in further consolidation of the layer 2 subjects representing the unit from which he/she is elected.

A layer 2 subject is comprised of a number of the layer 1 subjects. Each layer 2 member is also the leader of a layer 1 unit, and he/she is not only working on the subject from his original layer 1 unit, but also the subjects from other members in the layer 2 unit. All the members work on the subjects has to be approved by the majority of the members in the corresponding unit through voting.

Dotted lines $_4$316, $_4$322 represent multiple intermediate layers (not shown) and subjects (not shown) towards the highest layer N units and layer N subjects. Each layer follows the same rules.

Information Products

The consolidated results at each layer through SOwiki structure all possess a certain value to the targeted groups of users. For instance, the news category at each level and sub category area (i.e. communities to town, city, global) are of a value to the users that are covered by this layer or area; in the professional fields, the contents at each layer and field are of value to the users in the targeted field, Therefore, newspapers series that cover different areas, fields or levels $_4$403 can be produced naturally from the bottom to up.

The information that is filtered from Internet sources, such as Facebook or Twitter, using SOC methods may be presented in the form of news scroll $_4$405, and distributed at any time through wireless network, mobiles etc, hence becoming the new media to satisfy the needs of community communication, city life, public entertainment, and the like.

Automatic searching is mainly conducted based on letters or characters by machine which is very limited in terms of assessing and ranking audio/video program where the use of human intelligence has preponderant advantage. In addition, the selected programs can be edited or consolidated using SOwiki methods and presented/distributed in the forms of various web "Audio/Video" stations $_4$407.

Assessing and filtering the information that are provided by participants $_4$201, SOwiki members (acting as editors) can obtain accurate, comprehensive, up-to-date information and create various guides $_4$404 to satisfy the needs of users in various fields (traveling, medical insurance, consumer reports, interests, etc.).

The attributes that SOC-SOwiki methods to consolidate information from different branches layer by layer, will attract many users to collaborate in a structured way for collaborative projects $_4$406 such as surveys, subject study, collective writing, magazine editing, translation, etc.

The final products will be distributed through SOC-SOwiki Platform $_4$410 so that network, users, such as Internet users $_4$411 can take advantage of its information to create various business models.

Technical Support

The SOIPS has a number of administrative functions. The products (or the extension of the products) created by the members of SOC-SOwiki will be credited by the module of "Credit Points Management System" $_4$501 (crediting algorithm is predefined and agreed by SOC-SOwiki). The Financial System $_4$503 will distribute the revenue among members based on the credit points they contribute.

Because a user can join multiple structures with different subjects, or be selected as a leader of any units that might not be at the same level, $_4$502 is a powerful ID management System to manage the complex member IDs and the permissions related the user's ID and corresponding access level.

The Self-Organization Information Process System is a platform which supports SOC-Sowiki structures to process information independently and respectively in order to create their own information products $_4$402. However the database tools $_4$504 allow the database to be sharable to make structure reorganization or transition easy.

Functionalities of SOC and SOwiki System

The FIG. 5 demonstrates the functionalities of SOC and Sowiki System. The platform supports all the functions needed to create/operate SOC applications (covered in the dashed-line frame $_5$300 and as well as SOwiki applications (covered in the solid line frame $_5$400). Functions of SOC system are the subset of SOwiki system.

Members of SOC or SOwiki structures come from network users, such as Internet users $_5$200. The sources of information $_5$100 are either created or collected from the network, such as the Internet by members. Various applications/products $_5$780 can be created/implemented by taking advantage of SOC or SOwiki functions.

SOC $_5$300

A member management module $_5$310 provides the functions for users to grow SOC by recruiting people from outside through its lowest/base level by invitation or self-introduction. A voting process will be prompted for the unit that prospective member is intended to join, and the prospective member will become member officially and assume all the responsibilities and rights if the majority of the unit vote in favor of the prospective member joining the unit. The module also provides the function to develop restrictions over memberships in addition to regular membership management.

A system set-up module $_5$303 provides the functions to set system parameters. A series of parameters need to be taken into consideration to start a system. The system set-up module provides default values, but founders/initiators of SOC or SOwiki structure have the option to either use default values or to provide values they prefer. It also provides tools and processes for members to determine/reset parameter values at any phase. Whenever there is a proposal to reset parameter(s) and the required motion second minimum number of members seconds the motion to change given parameters, the system will prompt a voting process. The parameter(s) will be reset if certain percentage (default value: ½) of all the members, and of the leaders (default value: ⅔) at the highest layer vote in favor.

An election module $_5$302 provides the functions for members to elect leaders. Progressing from bottom up, each unit elects its leader by voting. That elected leader is then a member of the next immediately higher layer. Any member can propose a motion for re-election of its unit leader at any time, and responsibilities and rights of the position will be automatically transferred from the old leader, if the old leader loses the election, to the newly leader-elect if a majority (or a value as pre-defined) vote in favor of the new leader.

A unit splitting module $_5$304 provides functions to split a unit when the unit reaches ñ (maximum size of a unit, a parameter defined in system set-up), a splitting process will be prompted by the system. If there is upper layer on top, the unit will split into no less than n (the minimum size of a unit, a parameter defined in system set-up) new units, each of which should have no less than n members.

A layer growing module ₅305 provides functions to grow layers of SOC and SOwiki structures. When a unit reaches ñ (maximum size of a unit, a parameter defined in system set-up), it will be split into at least n̲ (the minimum size of a unit, a parameter defined in system set-up) new units. The elected leaders of each of the new units then form a new unit of a higher level, and hence a new layer, if it does not already exist. The units at higher level can grow new layers from up and down as well as shown in FIG. 2.

A voting module ₅306 provides functions for members to cast votes. Voting can be conducted within a unit, or as referendum within a branch or whole system/structure for the purpose of decision making on various matters. The weighted votes are automatically calculated, and the results are the keys to automatically turn on/off related rights that result from the election.

A blog module ₅307 creates and provides functionality to each blog of the system. Each member is provided with personal blog and the opinions or activities of this person are presented and recorded in this blog. Each leader is equipped with position blog and the opinions or activities related to this position are presented and recorded in this blog.

A forum module ₅308 creates and provides functionality to each forum of the system. Each unit is provided with internal forum for unit members to deal with internal affairs through discussion or decision making (voting or electing); each branch is provided with internal forum for its members to submit/view inputs and provide feedbacks, and as well, to conduct referendum within it.

A reorganization module ₅309 provides the functions to create dynamic and rich forms of SOC structures through unit or branch transferring, merging, seceding or affiliating within same structure or among different structures.

Sowiki ₅400

A member management nodule ₅401 provides functions to support Sowiki's methods of absorbing new members. Sowiki absorbs new members mainly through self-introduction by way of a prospective member's participation by providing inputs through Wiki at the base layer, and will then become member if the majority of the members of the unit that the prospective member is intended to join vote in favor for the inputs/content submitted by the prospective member. The members who have been inactive for predetermined time will be categorized as inactive member and won't be included in the calculation of vote weight.

A wiki module ₅402 provides the functions for members to create, provide, or revise information in the system.

A wiki consolidation module ₅403 provides functionality to review and consolidate contents based on voting. Content that is created, provided, or updated is provisionally stored pending for review. The content will become effective or not according to the voting of the unit that the contents belong to.

A unit creation module ₅404 provides the functions for members to create subordinate new unit, and supports the methods of unit management. For example a new unit will not be eligible to vote if the number of its members is less then n̲ (the minimum size of a unit, a parameter defined in system set-up). The unit's right of voting will be surrogated by its upper unit and be restituted to the unit once the number of the members reaches ≥n̲.

A content re-organization module ₅405 provides functions to support SOC structure re-organization, this module provides the functions for members, using Sowiki methods, to reorganize the Sowiki structures as well as the contents resulting from such restructure.

One or more application program interfaces (APIs) ₅601 and ₅602 may be provided. The APIs allow user to implement their own programs to be used in the SOC-SOwiki platform or in conjunction therewith.

It will be understood that the structures and information presented above may be saved in computer database in any format known in the art. In some embodiments, each unit of the structure has unit record ₆640 stored in a computer datastore, such as a database. The unit record or structure has a unit ID section ₆641, a superior unit section ₆642, a leader section ₆643, a project(s) section ₆644, and a history section ₆645. The unit ID section contains a unique unit identifier. The superior unit section ₆642 contains the unit ID which the unit is subordinate to in the next immediately higher layer. The leader section ₆643 contains the name or unique identifier of the member that is the leader of that unit. The project(s) section ₆644 contains one or more projects or goals of the unit. The history section ₆645 contains a transaction history of events occurring in the unit, such a votes on leadership of the unit, votes on any topic in the unit, the joining of members to the unit, the exiting of members from the group, information on whether results or content submitted by the unit to superior unit was accepted or rejected, or the like.

One skilled in the art will recognize that not every section of the unit record ₆640 is necessary to implement the invention. For example, in some embodiments, the hierarchal structure of the SOC or the SoWiki is represented in a relationship table ₆630. As shown in FIG. 6, the table has a unit column ₆631 and a superior unit column ₆632. Therefore, for each unit in the unit column, that unit's immediately superior unit is recorded in the superior unit column of that row. The example shown in FIG. 6 provides that a first layer having units 1, 3, 4, 5, 8, 9, 11, 12, 13, and 14, a second layer having units 2, 6, and 10, and a third layer having unit 7. Units 1, 3 and 8 in the first layer are subordinate to unit 2 in the second layer; units 4, 5, 9, and 11 are subordinate to unit 6 in the second layer; and units 12, 13, and 14 are subordinate to unit 10 in the second layer. Units 2, 6, and 10 in the second layer are subordinate to unit 7 in the third layer. The value 0 in column ₆632 across from unit 7 indicates unit 7 is presently in the top layer with no other units superior to it. Other values can be provided to show a top layer unit. Units 1, 2, 3, 7, and 8 comprise one branch of the structure. Units 4, 5, 6, 7, and 9 comprise a second branch of the structure. Units 10, 12, 13, 14, and 7 comprise a third branch of the structure. Other sub-branches can be described from this structure and others. Therefore the structure of the SOC and the SoWiki can be represented in a flat relationship table. Other associations between units can also be shown in a table in a similar manner, such as an affiliation between units as explained about with reference to FIG. 3. In other embodiments, the SOC and SoWiki structure is represented by other relationship recording structures in a computer datastore, such as a database, flat file, or other computer data structures known in the art.

In some embodiments, each member of any unit of the structure has member record ₆610 stored in a computer datastore, such as a database. The member record ₆610 has a record ID section ₆611, a member name section ₆612, a password section ₆613, a unit membership ₆614 section, and a leadership section ₆615. The record ID section ₆611 contains a unique user record ID value. The member name section contains the member's user name. In some embodiments, all member user names are unique, in which case the record ID section is not used and instead the member name section is relied on for identification. The password section contains authentication information such as a password. The unit membership section contains information about which units the member has a membership in. The leadership section contains information about which units that a member is a leader of.

Figure 7:
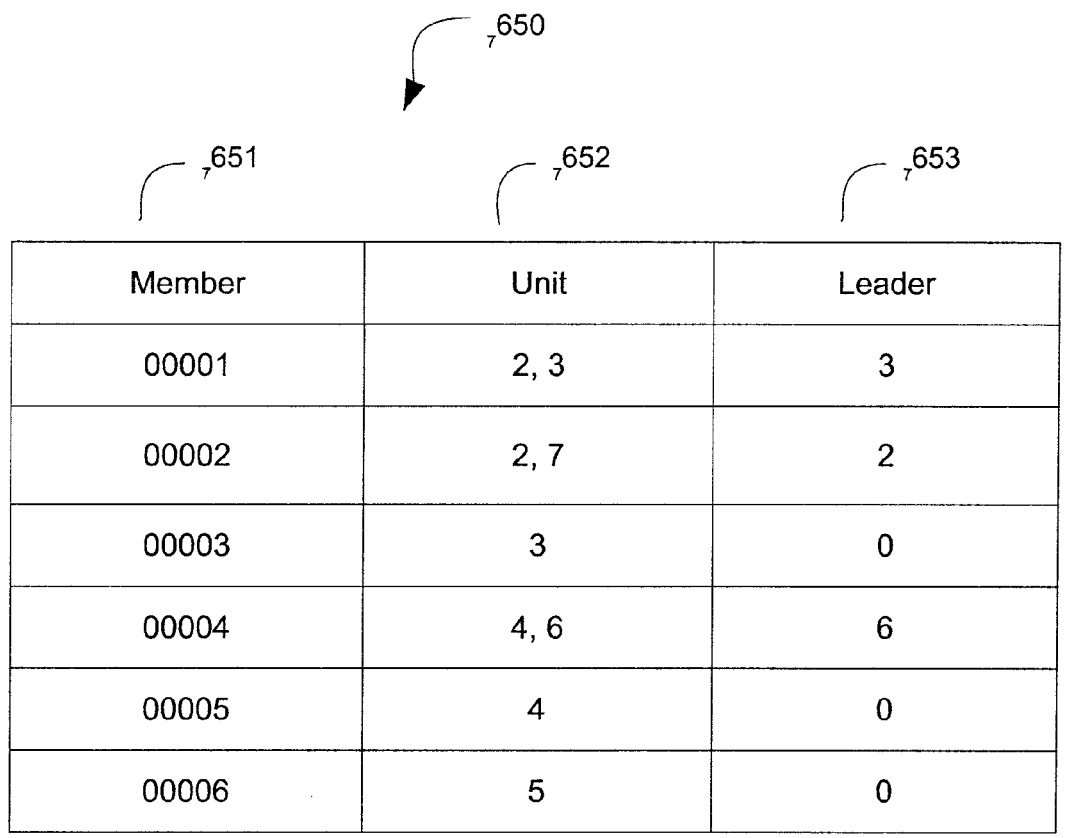
FIG. 7 is a diagram view of a user table of an embodiment of the invention.

One skilled in the art will recognize that not every section of the unit record $_6$640 is necessary to implement the invention. For example as shown in FIG. 7, in some embodiments, members' unit membership information is represented in a user table 7650. Member IDs are listed in the member ID column $_7$650 for each member of the SOC or SoWiki structure. In unit column $_7$652 each unit of which the member has membership in is listed. In leader column $_7$653 each unit that the member is a leader of is listed. Therefore member ID 00002 is a member of units 2 and 7 and is a leader of unit 2.

The forgoing SOC, SoWiki, and SOIPS and any step, function, module, or method described above may be implemented as instructions on a programmable general computer, or across multiple computers, capable of carrying out the instructions to achieve the step, function, module, method, or result indicated. In some embodiments, the general purpose computer has a processor signal connected to a memory, an input/output device, and a network adapter. The general purpose computer may be a service connected to a database. The general purpose computer may be accessible over a network, such as the Internet.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. An electronic information filtering computer system, comprising:
a processor;
a memory, the processor is signal-connected to the memory;
a link datastore stored on the memory, configured to hold one or more address links, associated with a network location corresponding to information available over a computer network, one or more categories associated with each of the one or more address links, and a link rank associated with each of the one or more address links;
a hierarchal tree organizing structure stored on the memory, comprising a plurality of layers and a plurality of units, each layer below a top layer of the plurality of layers comprising three or more of the plurality of units, each unit of the plurality of units is associated with at least three member records, each member record corresponding to a human member, each unit of the plurality of units above a base layer of the plurality of layers is a receiving superior unit for receiving an output from at least three reporting inferior units of the plurality of units in a next lower layer of the plurality of layers, each member of the receiving superior unit is elected from a membership of one of the reporting inferior units, each unit of the plurality of units below the top layer provides output to only one receiving superior unit in a next higher layer of the plurality of layers;
a new member function executable by the processor to receive a new member in a base unit of the plurality of units in the base layer of the hierarchal tree organizing structure by creating a member record associated with the base unit and the new member when an electronic membership vote of human members associated with member records of the base unit approve granting membership in the base unit to the new member, a new member who was not previously a member of any unit of the plurality of units is only initially eligible for admission into membership of units in the base layer; and
a link receiving function executable by the processor for receiving an address link to be reviewed by one or more human members and storing the address link in the link datastore;
a content view request function executable by the processor for receiving, from a member of a unit of the plurality of units, a content view request to view content of a category of the one or more categories;
a link retrieval function executable by the processor for retrieving from the link datastore at least one address link associated with the category;
a link sending function executable by the processor for sending, via the computer network, the at least one address link retrieved from the link datastore and associated with the category, to the member making the content view request;
a preliminary recommendation function executable by the processor for receiving a preliminary recommendation of the at least one address link from at least one human member associated with a member record associated with a unit of the plurality of units,
a preliminary rank increasing function executable by the processor for increasing the link rank associated with the address link if the address link receives the preliminary recommendation;
an address link vote prompting function executable by the processor to prompt, via electronic communication, human members associated with member records associated with a unit of the plurality of units in a present layer of the plurality of layers, to address link vote whether to promote the address link associated with the category if the address link previously received the preliminary recommendation; and
a designating function executable by the processor for designating the address link for review by the receiving superior unit in a next layer, of the plurality of layers, above the unit, if said receiving superior unit exists and if a pass number of human members of the unit vote to promote the address link during the address link vote.

2. The system of claim 1, comprising a unit work definition function executable by the processor configured to assign one or more categories of the one or more categories to one or more units of the plurality of units, wherein the human members associated with a unit of the plurality of units determine, by a vote of human members associated with the unit, the one or more categories that are to be assigned to the unit.

3. The system of claim 1, comprising a rank assignment function executable by the processor for increasing the link rank associated with each address link in the link datastore based on a number of times the address link was designated for review.

4. The system of claim 3, comprising a search result function executable by the processor for
receiving a search request from a searcher,
identifying search results comprising address links from the link datastore associated with one or more categories, of the one or more categories, generating a match with the search request, and
ordering the search results into a search result list according to the link rank associated with each address link.

5. The system of claim 4, comprising a result transmission function executable by the processor for sending the search result list to the searcher via the computer network.

6. The system of claim 1, comprising a structure administration function executable by the processor for managing the organizing structure, the structure administration function comprising a unit forming function for forming one or more units in a layer of the plurality of layers of the hierarchal tree organizing structure; and, a leader selection function for electing in each unit of the plurality of units, by an electronic vote of human members associated with member records of each unit, one human member of each unit as a leader for the corresponding unit.

7. The system of claim 1, comprising link rank increasing function executable by the processor for increasing the link rank associated with the address link if a predefined number of human members associated with member records of the unit vote to promote the address link during the address link vote.

8. The system of claim 7, wherein the preliminary rank increasing function increases the link rank associated with the address link by a first increase amount if the address link receives the preliminary recommendation, and wherein the system comprises a second increase rank function executable by the processor for increasing the link rank by a second increase amount associated with the address link if the pass number of human members associated with member records of the unit vote to promote the address link during the address link vote; the second increase amount is greater than the first increase amount.

9. The system of claim 1, wherein the address link vote prompting function is configured to select at least one address link among address links designated for review by a reporting inferior unit when the unit associated with members voting in the address link vote are in a layer of the plurality of layers above the base layer.

* * * * *